Patented Mar. 9, 1937

2,072,870

UNITED STATES PATENT OFFICE 2,072,870

CELLULOSE DERIVATIVES

Henry Dreyfus, London, England

No Drawing. Application December 15, 1932, Serial No. 647,433. In Great Britain January 6, 1932

10 Claims. (Cl. 260—101)

This invention relates to the manufacture and application of new nitrogen-containing cellulose derivatives.

In my U. S. Patent No. 2,007,950, I have described inter alia the manufacture of new cellulose derivatives by treating carboxy or hydroxy esters or ethers of cellulose so as to replace in the simple hydroxy groups or hydroxy radicles in the carboxy groups by substituted amino groups. Such substitution may take place either directly or by first halogenating the ester or ether and replacing the halogen atom or atoms with the substituted amino groups. I have now found that further new nitrogen-containing cellulose derivatives may be obtained by treatment with nitrogen-containing organic compounds of cellulose esters or ethers containing unsaturated groupings, for example of the ethylene type or the acetylene type.

According to the present invention, therefore, new nitrogen-containing cellulose derivatives are produced by reacting upon a cellulose ester or ether containing unsaturated groupings with nitrogen-containing organic compounds, and particularly organic bases containing a replaceable hydrogen atom attached to nitrogen. The treatment may take place, for example, at atmospheric temperature and pressure, or at increased temperatures and/or at increased pressure.

In the case of treating cellulose esters with the organic bases the conditions are preferably so chosen that saponification of the ester by the base is either avoided altogether or is only partial. The tendency of bases to saponify the esters may be reduced or eliminated in a number of ways. For example I have found that the higher aliphatic bases have less tendency to saponify the ester than have the lower aliphatic bases or the strong cyclic bases. Further the amount of base may be adjusted so that practically the whole of it combines with the unsaturated groupings in the cellulose ester, so that no excess remains for effecting saponification of the ester. In addition the reaction may be carried out under substantially anhydrous conditions, in which case saponification of the ester may be reduced to a minimum. Any two or more of the above expedients may of course be adopted to repress saponification.

When, as is described below, the unsaturated cellulose derivatives are previously treated with halogenating agents or halogen acids, a base, for example calcium hydroxide or an organic base containing no replaceable hydrogen atom, e. g. dimethyl aniline or pyridine may be present during the formation of the nitrogen-containing derivative, particularly in the case of cellulose ethers.

The process of the present invention may be applied to the treatment of unsaturated cellulose esters or ethers of any series. For example the esters may be of the aliphatic series, the ester groupings being either unsubstituted or substituted, as for example by hydroxy groups or by carboxy groups, by both hydroxy groups and carboxy groups, for instance, cellulose crotonate, cellulose undecylenate, cellulose oleate, cellulose linoleate, cellulose ricinoleate, cellulose maleate and the like. Similarly other series of acids may be used to form the initial esters, as for example acids of the aromatic series, as in the cellulose cinnamate, or of the alicyclic series. Again the cellulose ethers may be simple unsaturated aliphatic ethers of cellulose, as for instance in allyl cellulose, vinyl cellulose or crotonyl cellulose, or of the cyclic series, as for instance in styryl cellulose (made from bromstyrene and alkali cellulose). All the substituent groups on the cellulose molecule may be unsaturated or part may be saturated and part unsaturated. Thus, for instance, in addition to the unsaturated ester or ether groups the cellulose molecule may contain saturated ester or ether groups, as for instance acetyl, formyl, propionyl, butyryl, benzoyl, methyl, ethyl, propyl or benzyl groups, or oxyalkyl groups, as for example oxyethyl groups. Two or more unsaturated ester or ether groups and/or two or more saturated ester or ether groups may be present. Mixed ether-esters of cellulose may be employed, the whole or part of either the ether or the ester groups or both being unsaturated as for example in oxyethyl cellulose undecylenate and oxypropyl cellulose crotonate.

The initial ester or ether may if desired be in fibrous form, for example in a form in which it is obtained by esterification or etherification of cotton or other cellulose yarn or fabric with the appropriate esterifying or etherifying agent without resultant solution of the product, the process being similar to that employed in the production of "immunized cotton".

The bases with which the cellulose derivatives are to be treated may also be of any desired series, for example of the aliphatic series, such as methylamine, ethylamine, propylamine, amylamine, hexylamine, and may, if desired, be substituted, as for example in mono- or di-ethanolamine, propanolamine, dioxy-proplyamine or the alcoholic amines obtainable by reduction of cyanhydrins according to my U. S. application S. No. 535,285 filed May 5, 1931, the cyanhydrins being obtainable for instance by combination of hydrogen cyanide with ketones, for instance acetone or methyl-ethyl ketone, or aldehydes, such as acetaldehyde or propionaldehyde, or alkylene oxides, for example ethylene oxide. Other substituent groups, such as carboxy substituents, may be present in the base, as for instance in the compounds obtainable by amidation of fatty acids, whether unsaturated or not, or by halogenation followed by amidation. In this connection it is to be noted that the use of amino acids affords another means of reducing saponification of a cellulose ester, since the presence of the carboxy group or of other acid groups in the base to be used reduces the basicity of the reagent. Esters of amino acids may also be employed, e. g. methyl or ethyl glycine.

Substituted or unsubstituted cyclic bases may be used, for example aniline, toluidines, xylidines, cyclohexylamine, benzylamine, or their alkyl derivatives such as methyl, ethyl or benzyl aniline, or piperidine. Urea, guanidine and substituted ureas and guanidines are also useful especially in the case of treating unsaturated cellulose ethers or in the case of making a halogenated cellulose derivative as an intermediate product, as described below. Other substances which contain replaceable hydrogen atoms attached to nitrogen may be used e. g. acetamide and benzamide.

The reaction between the cellulose ether or ester and the base may as already referred to be carried out at ordinary atmospheric or reduced pressure, but is preferably effected under increased pressure, and similarly the use of elevated temperatures tends to increase the nitrogen content of the resulting cellulose esters or ethers. The base may be used in the liquid state or where feasible it may be brought into contact with the cellulose ester or ether in the vapor state, e. g. by circulating the vapours of the organic base through the unsaturated cellulose derivative. The reaction may be carried out with the base and the cellulose ester or ether alone or may be effected in the presence of solvents or diluents, for example benzene, toluene, xylene, or other liquid hydrocarbons or alcohols. Preferably the solvent or diluent will not be itself capable of reaction with the organic base. Instead of treating the unsaturated cellulose ester or ether directly with the base, the ester or ether may first be halogenated as, for example, by direct treatment with chlorine, bromine or other halogen, or by treatment with a halogenating compound, e. g. sulphuryl chloride or a halogen acid, and the product then treated with the desired organic base to produce the nitrogen-containing cellulose derivative.

The following examples are given in order to illustrate the invention but it is to be clearly understood that they do not limit it in any way:—

*Example 1*

Bromine in carbon tetrachloride is introduced gradually into a vessel containing allyl cellulose and carbon tetrachloride maintained at a temperature of 25–35° C. When no further absorption of bromine takes place the carbon tetrachloride and excess bromine are removed, preferably under reduced pressure, and the cellulose derivative is carefully washed with ligroin.

A nitrogen-containing derivative is then obtained by heating the product with 2–3 times its weight of diethylamine at a temperature of 80°–100° C. in a closed vessel, if desired in the presence of a weak alkaline reagent such as calcium hydroxide. It is purified by distilling off excess diethylamine and washing with water or other non-solvent.

*Example 2*

Cellulose crotonate is heated either under reflux or in a closed vessel at 100°–120° C. with about 6–8 times its weight of benzene and 3–4 times its weight of piperidine. The nitrogen-containing derivative obtained is purified by heating under reduced pressure to remove the excess piperidine and benzene followed by solution in a suitable solvent.

*Example 3*

Cellulose linoleate is heated under pressure at 130–140° C. with from 1½–2 times its weight of glycine or of the ethyl ester of glycine in the presence of 6–8 times its weight of toluene. A nitrogen-containing derivative is obtained.

*Example 4*

A nitrogen-containing derivative may be obtained by continuously circulating the vapours of aniline through cellulose cinnamate in the fibrous form. The reaction is carried out at slightly reduced pressure, e. g. at a pressure at which the aniline boils at 140°–160° C. On completion of the reaction the aniline present is removed by passing steam or nitrogen or other inert gas through the vessel at a temperature of 100°–120° C.

In all the above examples in which a liquid is employed it is desirable that the mixture be well stirred during the reaction.

The nitrogen-containing cellulose derivatives produced according to the present invention have in common with those produced according to my U. S. application S. No. 492,363 filed October 30, 1930, an affinity for acid wool colours, and for most of the direct cotton colours. For this reason they are valuable for the manufacture of textile materials, particularly when used in conjunction with the known cellulose esters or ethers, for example cellulose acetate, which lack affinity for certain dyestuffs. In addition to being suitable for conversion into textile products the cellulose derivatives of the present invention may be used for the manufacture of plastic masses, and are particularly useful where colouration with sulphonated or like dyestuffs is required, and for the manufacture of films, moulding powders and the like. The plastic masses or moulding powders may be made up with any suitable plasticizing agents, as for instance those used in the manufacture of plastics from nitro-cellulose and cellulose acetate.

In addition the cellulose derivatives of the present invention may be used in the preparation of sizes for textile yarns and fabrics, and in this connection the cellulose derivatives which contain hydroxy groups or carboxy groups or other hydrophile groups, whether present in the original cellulose ester or ether or present in the organic base with which such cellulose ester is so treated, are particularly valuable. These sizes inasmuch as they have an affinity for acid and direct colours may be the means of imparting fugitive tints with the aid of acid wool or direct cotton colours to fibres, such as cellulose acetate, which have little or no affinity for such colours.

Cellulose derivatives produced according to the present invention containing hydroxy or carboxy substances may, if desired, be further treated to esterify or etherify such groups, for example by treatment with acetic anhydride or other esterifying agent or by treatment with alcohol and sulphuric acid, dimethyl sulphate or other methylating or ethylating or like agents.

What I claim and desire to secure by Letters Patent is:—

1. Process for the manufacture of nitrogen-containing cellulose derivatives which comprises reacting an organic base containing one or more replaceable hydrogen atoms attached to nitrogen with a derivative of cellulose containing an unsaturated grouping selected from the group consisting of cellulose ethers, carboxylic acid esters of cellulose and mixed cellulose ether-carboxylic acid esters.

2. Process for the manufacture of nitrogen-containing cellulose derivatives which comprises reacting an organic base containing one or more replaceable hydrogen atoms attached to nitrogen with a cellulose ester of an unsaturated carboxylic acid.

3. Process for the manufacture of nitrogen-containing cellulose derivatives which comprises reacting an aliphatic amine containing at least four carbon atoms with a cellulose ester of an unsaturated carboxylic acid.

4. Process for the manufacture of nitrogen-containing cellulose derivatives which comprises reacting a derivative of cellulose containing an unsaturated grouping selected from the group consisting of cellulose ethers, carboxylic acid esters of cellulose, and mixed cellulose ethers-carboxylic acid esters with a halogenating agent and subsequently with an organic base containing one or more replaceable hydrogen atoms attached to nitrogen.

5. Process for the manufacture of nitrogen-containing cellulose derivatives which comprises reacting a derivative of cellulose containing an unsaturated grouping selected from the group consisting of cellulose ethers, carboxylic acid esters of cellulose, and mixed cellulose ethers-carboxylic acid esters with a halogenating agent and subsequently with an amine.

6. Process for the manufacture of nitrogen-containing cellulose derivatives which comprises reacting an organic base containing one or more replaceable hydrogen atoms attached to nitrogen with a derivative of cellulose containing an unsaturated grouping selected from the group consisting of cellulose ethers, carboxylic acid esters of cellulose and mixed cellulose ether-carboxylic acid esters in an inert medium.

7. Process for the manufacture of nitrogen-containing cellulose derivatives which comprises reacting an organic base containing one or more replaceable hydrogen atoms attached to nitrogen with a derivative of cellulose containing an unsaturated grouping selected from the group consisting of cellulose ethers, carboxylic acid esters of cellulose and mixed cellulose ether-carboxylic acid esters and subjecting the products to esterification or etherification.

8. Nitrogen-containing cellulose derivatives obtained by reacting an organic base containing one or more replaceable hydrogen atoms attached to nitrogen with a derivative of cellulose containing an unsaturated grouping selected from the group consisting of cellulose ethers, carboxylic acid esters of cellulose and mixed cellulose ether-carboxylic acid esters.

9. Nitrogen-containing cellulose derivatives obtained by reacting an aliphatic amine containing at least four carbon atoms with a derivative of cellulose containing an unsaturated grouping selected from the group consisting of cellulose ethers, carboxylic acid esters of cellulose and mixed cellulose ether-carboxylic acid esters.

10. Nitrogen-containing cellulose derivatives obtained by reacting an organic base containing one or more replaceable hydrogen atoms attached to nitrogen with a cellulose ester of an unsaturated carboxylic acid.

HENRY DREYFUS.